(12) United States Patent
Nesbitt et al.

(10) Patent No.: US 6,787,235 B2
(45) Date of Patent: Sep. 7, 2004

(54) CONSOLIDATED AMORPHOUS CARBON MATERIALS, THEIR MANUFACTURE AND USE

(75) Inventors: Carl C. Nesbitt, Hancock, MI (US); Xiaowei Sun, Houghton, MI (US)

(73) Assignee: Reticle, Inc., Los Altos Hills, CA (US)

( * ) Notice: Subject to any disclaimer, the term of this patent is extended or adjusted under 35 U.S.C. 154(b) by 0 days.

(21) Appl. No.: 10/315,747

(22) Filed: Dec. 10, 2002

(65) Prior Publication Data

US 2003/0104208 A1 Jun. 5, 2003

Related U.S. Application Data

(60) Continuation of application No. 09/675,031, filed on Sep. 28, 2000, now Pat. No. 6,544,648, which is a division of application No. 09/365,642, filed on Aug. 2, 1999, now Pat. No. 6,350,520.
(60) Provisional application No. 60/097,862, filed on Aug. 26, 1998, and provisional application No. 60/097,960, filed on Aug. 26, 1998.

(51) Int. Cl.$^7$ ................................................ B32B 9/00
(52) U.S. Cl. ...................... 428/408; 428/364; 428/367; 428/402; 423/445 R; 423/448; 423/449.1; 502/416; 502/42.3; 264/604; 264/640; 264/641; 264/667
(58) Field of Search ................................ 428/408, 364, 428/367, 402; 423/445 R, 448, 414, 449.1; 502/416, 423; 264/604, 640, 641, 667

(56) References Cited

U.S. PATENT DOCUMENTS

| | | | |
|---|---|---|---|
| 2,027,695 A | 1/1936 | McCulloch et al. | |
| 3,839,515 A | 10/1974 | Romovacek | |
| 3,883,412 A | 5/1975 | Jensen | |
| 4,046,863 A | 9/1977 | Kobayashi et al. | |
| 4,094,897 A | 6/1978 | Nagasawa et al. | |
| 4,580,337 A | 4/1986 | Shigeta et al. | |
| 4,654,242 A | * 3/1987 | Schieber | |
| 4,664,683 A | 5/1987 | Degen et al. | |
| 4,671,907 A | 6/1987 | Iwahashi et al. | |
| 4,678,771 A | 7/1987 | Beitinger et al. | |
| 5,045,298 A | * 9/1991 | Muramatsu et al. | |
| 5,260,855 A | 11/1993 | Kaschmitter et al. | |
| 5,326,607 A | 7/1994 | Muramatsu et al. | |
| 5,331,037 A | * 7/1994 | Koslow | |
| 5,336,520 A | 8/1994 | Hoenig | |
| 5,567,523 A | 10/1996 | Rosenblum et al. | |
| 5,853,840 A | 12/1998 | Saito et al. | |
| 5,976,697 A | 11/1999 | Brehler et al. | |
| 6,018,078 A | 1/2000 | Harris et al. | |
| 6,099,965 A | 8/2000 | Tennent et al. | |
| 6,150,023 A | 11/2000 | Yasaka et al. | |

FOREIGN PATENT DOCUMENTS

| | | |
|---|---|---|
| CN | 1086791 A | 5/1994 |
| JP | 04125107 | 4/1992 |
| JP | 08119615 | 5/1996 |

OTHER PUBLICATIONS

Chemical Abstracts 1953 47: 5095e.
Chemical Abstracts 1960 54: 10290i.
Chemical Abstracts 1960 54: P9565b.
Chemical Abstracts 1965 59: 7268a.

(List continued on next page.)

*Primary Examiner*—Archene Turner
*Assistant Examiner*—Wendy Boss
(74) *Attorney, Agent, or Firm*—Michael Best & Friedrich, LLP

(57) ABSTRACT

A carbon based material produced from the consolidation of amorphous carbon by elevated temperature compression. The material having unique chemical and physical characteristics that lend themselves to a broad range of applications such as in electrical, electrochemical and structural fields.

46 Claims, 11 Drawing Sheets

OTHER PUBLICATIONS

Chemical Abstracts 1970 64: P19203g.
Chemical Abstracts 1970 72: R91795p.
Chemical Abstracts 1970 73: 27368v.
Chemical Abstracts 1978 89: 151347g.
Chemical Abstracts 1979 91: 109650s.
Chemical Abstracts 1980 93: 187578e.
Chemical Abstracts 1980 93: 116614c.
H. V. Atkinson and B. A. Rickinson, The Adam Hilger Series on New Manufacturing Processes and Materials, Hot Isostatic Processing, 1991, pp. 1–71, 95–105, 125–129, 153–155, Adam Hilger imprint by IOP Publishing Ltd, England and USA.
Chemical Abstracts 1974 81: 18356c.
Chemical Abstracts 1966 65: 6890.
Chemical Abstracts 1965 62:6240.

* cited by examiner

Pore distributions in the carbon material produced under different HIP pressures, T:800°C, time: 1 hr.

CYCLIC VOLTAMMOGRAM OF HIPed CAC ELECTRODE IN 1 M KCl SOLUTION, HIP PARAMETER: 3KSi, 800°C, 1 HOUR

Cyclic voltammogram of HIPed CAC electrode in 30% wt $H_2SO_4$ solution, HIP parameter: 3 Ksi 800°C, 1 hour.

Cyclic voltammogram of HIPed CAC electrode in 30% wt $H_2SO_4$ solution, HIP parameter: 10Ksi 800°C, 1 hour.

CYCLIC VOLTAMMOGRAM OF HIPed CAC ELECTRODE IN 30% WT $H_2SO_4$ SOLUTION, HIP PARAMETER: 25 Ksi 800°C, 1 HOUR

DESALINATION OF 500 PPM NaCl
SOLUTION, APPLIED VOLTAGE: 1.2V
TOTAL CARBON: 3g (3 PAIRS), FLOW
RATE: 0.38 ml/min, $C_0$: 500 ppm

CONSOLIDATED AMORPHOUS CARBON MATERIALS, THEIR MANUFACTURE AND USE

RELATED APPLICATIONS

This is a continuation of U.S. patent application Ser. No. 09/675,031, filed Sep. 28, 2000 and issued Apr. 8, 2003 as U.S. Pat. No. 6,544,648, which is a divisional of U.S. patent application Ser. No. 09/365,642, filed Aug. 2, 1999 and issued Feb. 26, 2002 as U.S. Pat. No. 6,350,520, which claims the benefit of provisional patent application 60/097,862, filed Aug. 26, 1998 and 60/097,960, filed Aug. 26, 1998.

FIELD OF THE INVENTION

This invention relates to a new carbon based material, its manufacture and use. More particularly, the invention relates to a carbon based material produced from the consolidation of amorphous carbon under elevated temperature compression leaving a broad range of applications, such as for example, as electrode material and as structural material.

BACKGROUND OF THE INVENTION

Carbon is a solid element that exists in many forms. Solid carbon can have a tetrahedral crystalline array (diamond) or hexagonal graphine planes. If the graphine planes are arranged in planar formations, the resulting solid is known as graphite. If the graphine planes are more randomly arranged, the resulting form of carbon is known as amorphous carbon. Activated carbon, carbon black and charcoal are examples of amorphous carbon. With respect to crystallinity, graphite has short range and long range order, while amorphous carbon has only short range order in the graphine planes. This difference is manifested in their surface properties with amorphous carbon being more reactive than graphite. The difference is also manifested in the spectral patterns generated when the material is tested by x-ray diffraction—graphite spectra show ordered crystal patterns, while the amorphous material pattern has no discernible pattern.

One form of amorphous carbon, activated carbon, is manufactured from an organic source material. Typically, activated carbon is made through carbonization of organic materials, such as wood, coal, pitch, coconut shells, petroleum, animal bones, etc., followed by an activation process. During the activation process, some of the surface platelets are burned out leaving behind many pores with different shapes and sizes, hence activated carbon with an increased surface area and porosity is generated. In general, the pore size plays a role in determining the properties of the activated carbon for various applications. According to IUPAC definitions, pores can be characterized as macropores with pore diameters above 50 nm, mesopores with pore diameters between 2–50 nm, and micropores with pore diameters below 2 nm. In addition to its porosity, activated carbon is conductive and usually inert in many aqueous and organic systems.

Because of its porosity, activated carbon has been widely used in various industries as an adsorbent. The most commonly seen applications include deodorizing, decoloring of gas or liquid phase substances, and removing of toxic organics/inorganics from air and water. The mining industry uses activated carbon for the recovery of precious metals like gold from leaching solutions. Typically, activated carbon is packed into a column through which the gas or liquid to be treated is percolated continuously. The adsorption process takes place at the interface between the carbon phase and the fluid phase.

Its large specific surface area, porosity, conductivity and inert nature make it suited for use as an electrode in electrochemical applications such as energy storage devices and water deionization/desalination devices. The underlying principles of these electrochemical electrodes are rooted in the way that dissolved ions in water behave next to charged solids. Salt dissolves in water forming an electrolyte solution which has no net charge, that is, the net cationic charge will exactly equal the net anionic charge. When a charged solid (i.e., a particle, plate, etc.) is placed in such a solution, the ions of the electrolyte distribute in a manner that will minimize the charge density through a layer known as the electric double layer. Counter ions will be more concentrated within layers nearest the charged surface, but the concentration will gradually decay to equal ion charge in the bulk. A capacitor is formed between the charged surface and the net zero potential of the bulk. A typical value for this capacitance is on the order of 10 $\mu F/cm^2$ of surface area.

If two electrodes are placed in all electrolyte solution with an applied potential, the ions will partition so that the cations will migrate to the cathode to fill one double layer, and the anions will migrate to the anode and fill the other double layer. The separation of the cationic and anionic species in this manner is a means to store energy (ultracapacitors) or a means to desalinate water (capacitive deionization). Ultracapacitors have been studied as a potential storage mechanism in applications that require large energy storage devices capable of rapid energy discharge. The primary interest of these devices has been in electric automobiles and electronic devices. Capacitive deionization technology is recently being used in treating brackish water and seawater.

The basic operating principles of carbon electrodes are readily understood, but the manufacturing techniques for producing activated carbon electrode material have been limited. Three processes are currently used, identified by the types of materials they employ as feedstock: granular activated carbon, carbonization of polymers, and carbon aerogels.

Early in the 1950's, researchers started to use granular activated carbon to make electrodes for electrochemical studies. Because carbon particles cannot consolidate under normal conditions, it is thought necessary to either apply high pressure or some kind of binder to keep the carbon particles in contact in order to form an electrode. It is difficult to make such an electrode that is maintained under constant high pressure, the system would be unacceptably bulky and dangerous. Thus, most studies have been carried out on carbon electrodes with an organic or polymeric binder mixed together with the carbon powders. The binders can be organic polymers, clays, or inorganic chemicals. Disadvantages exist with the use of binders to form the electrodes. Binders block a large portion of carbon surfaces, causing some pores to be blinded, and occlusion therefore is inevitable, thus lowering the available surface area of the carbon. Binders also deteriorate the conductivity of the electrodes because most binders are themselves nonconductive. The contamination from the binders also hinders their uses in electroanalytical applications.

Modern carbon electrodes are manufactured from phenolic resins or other types of resins by a process in which the resin is preformed to a certain shape then subjected to high temperatures for extended periods of time until complete carbonization occurs. The resulting carbon has relatively large surface area, but the manufacturing technique requires the use of toxic and environmentally dangerous chemicals. Often, organic solvents and aromatic compounds, such as benzene and toluene, are evolved during the manufacturing process. The volume of carbon formed is considerably smaller than the original resin size which leads to low product yield. This is a significant problem if specific geometric shapes or sizes are required. This manufacturing technique also has the disadvantages of high material cost and weak material strength due to the "shrinking" of the precursor carbon at high carbonization temperatures.

Some specific carbon electrodes are manufactured from aerogel compounds with sol-gel technology by similarly carbonizing organic compounds. Resorcinol-formaldehyde, for instance, can be infiltrated into a conductive substrate or formed into a solid. Solvents may be rinsed through the material prior to pyrolization in an inert atmosphere, such as in argon or nitrogen. The pyrolysis process produces a vitreous carbon material which has a high surface area and high electrical conductivity.

However, this manufacturing technique includes extremely high manufacturing costs and leads to the release of organic solvents such as acetone, formaldehyde and aromatic compounds as the substrate is thermally changed to carbon. These can pose serious health hazards to workers near the furnaces. The final shape of the carbon materials is much smaller than the feed material. Additional processing would be required to produce a specific geometric shape.

Thus, there exists a need for a more efficient, less expensive, more environmentally friendly process to manufacture activated carbon electrodes.

With respect to ultracapacitors, in the early 1980s, technology was developed to make an ultracapacitor of very large capacitance, on the order of Farads. Normal capacitors have a pico- to micro Farad capacity. As high-energy storage devices, ultracapacitors call be used as load leveling devices for electric and hybrid vehicles, memory backup for computers, as well as applications in areas such as portable communications, pulse energy systems and actuators. With the development of electrical and electronic technology, demands for high-performance energy storage devices have emerged and have kept growing.

The idea of ultracapacitors is based on the theory of the electrical double layer. An electrical double layer is the ionic layer developed at the interface between a charged solid and an electrolyte. When a potential is applied over two electrodes in an electrolyte solution, electrical double layers are developed and a charge separation is obtained by building up of ions of opposite signs with the electrode. If electrodes are polarizable, a final charge state will be reached at equilibrium. Since an electrical double layer is essentially a charge separation layer, it behaves as an electrical capacitor. Accordingly to the double layer theory, the capacitance of an electrical double layer depends oil the charges stored in the double layer and the permitivity of the solvent within the double layer region. Typically, the specific capacitance of a double layer is on the order of 10 $\mu F/cm^2$. Much effort has been made to make ultracapacitors with various foes of activated carbon. Although prototype and commercial ultracapacitors have been made with activated carbon, overall performance has not been satisfactory mainly due to the inevitable problem of occlusion from binders used or the high cost of material manufacturing.

With respect to capacitive deionization, by taking advantage of the very high surface area of activated carbon, ions can be "stored" in electrical double layers when a potential is applied across two activated carbon electrodes, even though these ion species have no affinity to activated carbon in the absence of the applied potential. Once the electrodes are grounded or the polarity is reversed, the double layers are relaxed/reversed, then the stored ions are released back to the bulk solution. Therefore, a coupled deionization and regeneration process can be achieved. Previously; either an inert polymeric binder was used to form a block electrode or a membrane was used to constrain the carbon particles. As a consequence, the electrical and mass transfer resistance is very high and the overall performance is poor. It is clear that a block type electrode without a binder is greatly desired if activated carbon is going to be used for such electrochemical applications. It is obvious that a highly conductive monolithic activated carbon material with high surface area, larger macropore size and of lower cost is greatly desired for effective desalination/deionization.

Turning now to the use of amorphous carbon in producing structural materials, in the materials industry, few forms of carbon are useful for fabricating parts. Graphite is most commonly used in applications requiring conductive materials with high strength and low density, such as in various high temperature casting molds or electrode materials. Graphite can also be an admixture to improve the properties of other materials. Carbon reinforced with graphite fibers is a relatively new material that has found broad uses in lightweight structural material, sporting equipment, such as bicycle frames, golf clubs and tennis racquets, and by NASA for use in space vehicles such as the shuttle. These materials have unique high temperature strength properties which retain stiffness and strength even at temperatures exceeding 1650° C. These are very expensive materials because of the complex manufacturing process. Carbon fibers are mixed within resins, then pyrolyzed to generate the carbon-matrix materials around the carbon fiber reinforcement. These materials are then subjected to a long and complicated densification process known as chemical vapor deposition to produce the final product.

Therefore, there exists a need for a more efficient, less expensive process to manufacture carbon structural materials.

In the 1950's, a metallurgical process called hot isostatic pressing (HIPing) was introduced into the area of metallurgy. HIPing involves the isostatic application of a high pressure gas at an elevated temperature in a specifically constructed vessel. Under these conditions of heat and pressure, internal pores or defects within a solid body collapse and weld up in a process known as sintering. Encapsulated powder and sintered components alike are densified and consolidated. It is typical to operate a HIP at temperatures of 1000–3000° C. and pressures of 25,000–60,000 psi. Cold isostatic presses (CIPs) have also been developed which typically apply an isostatic pressure to a material at or near room temperature.

SUMMARY OF THE INVENTION

The present invention is a novel carbon based material and process for its production which takes advantage of the properties of amorphous carbon to produce a vastly improved material which has broad applications. The process incorporates consolidation of amorphous carbon under elevated temperature compression. The products of the process have unique chemical, electrical and physical characteristics.

The novel carbon based material of the present invention is versatile so as to be used in a broad range of applications such as in the manufacture of structural materials and of electrode materials. The process of the present invention is an inexpensive manufacturing method that produces materials that are near net shape or are readily machinable to specifications and the process is effective at generating monolithic carbon material without the use of binders, or any noxious or toxic chemicals. Carbon source material can be selected based on any combination of properties such as available surface area, particle size distribution, and conductivity to produce material with optimal properties for the specific application desired. Additionally, the process parameters can be optimized to produce specific material properties, such as degree of densification, internal porosity, available surface area, or other property that the end user may require. The process of the present invention provides for the making of large billets of activated carbon so that production costs could be reduced.

After consolidation at elevated pressures and temperatures, novel carbon material can be produced with desired surface areas, porosity, density, strength and resistivity. Cyclic voltammetry (CV) curves demonstrate that the novel material is stable over a wide potential range in aqueous solution and therefore suitable for electrochemical applications. A capacitive feature of the CV curves indicates that the novel material is capable of storing a great amount of charge. The novel material is suitable for application of ultracapacitors. For example, test cells using electrodes of the novel material demonstrated that the capacitor had a specific capacitance of 53 F/g in an aqueous electrolyte and 23 F/g in an organic electrolyte, based upon the electrode material only. Electrodes of the novel material can be used for deionization, such as desalination. Such electrodes are effective at removing ions at a low energy consumption rate.

It is a feature of the present invention to provide a novel material made of amorphous carbon consolidated under elevated temperature and pressure.

It is another feature of the present invention to provide a manufacturing process for the production of said novel carbon based material.

It is another feature of the present invention to provide a manufacturing process whose parameters can be altered to obtain the novel material having optimized characteristics for a particular application.

It is another feature of the present invention to provide a said novel material for a broad range of applications.

It is another feature of the present invention to provide an electrode made from the novel material.

It is another feature of the present invention to provide an activated carbon electrode made from the novel material.

It is another feature of the present invention to provide for the application of this novel material for use in the desalination of water.

It is another feature of the present invention to provide for the application of this novel material for use in ultracapacitors.

It is another feature of the present invention to provide the application of this novel material for use in the removal of solids from water in a manner of dewatering slurries or separating different solids in suspensions.

It is another feature of the present invention to provide the application of this novel material for use in the direct electroplating of metal from aqueous and non-aqueous electrolyte solutions.

It is another feature of the present invention to provide the application of this novel material in the deionization of water.

It is another feature of the present invention to provide the application of this novel material in environmental processing for the direct electrochemical destruction of pollutants and contaminants such as from water.

It is another feature of the present invention to provide the application of this novel material in water treatment, such as water softening and pH control.

It is another feature of the present invention to provide said novel material for use as a carbon structural material in a broad range of applications.

It is another feature of the present invention to provide the parameters of the manufacturing process for production of the novel material that could be used as a carbon-based composite or carbonaceous structural material.

It is another feature of the present invention to provide the application of this novel material for uses in highly corrosive or chemically active environments.

It is another feature of the present invention to provide the application of this novel material for uses in high temperature applications.

It is another feature of the present invention to provide the application of this novel material in uses in applications requiring materials of high strength, low density and/or specific porosity.

Other features and advantages of the invention will become apparent to those of ordinary skill in the art upon review of the following drawings, detailed description and claims.

Figure 1:
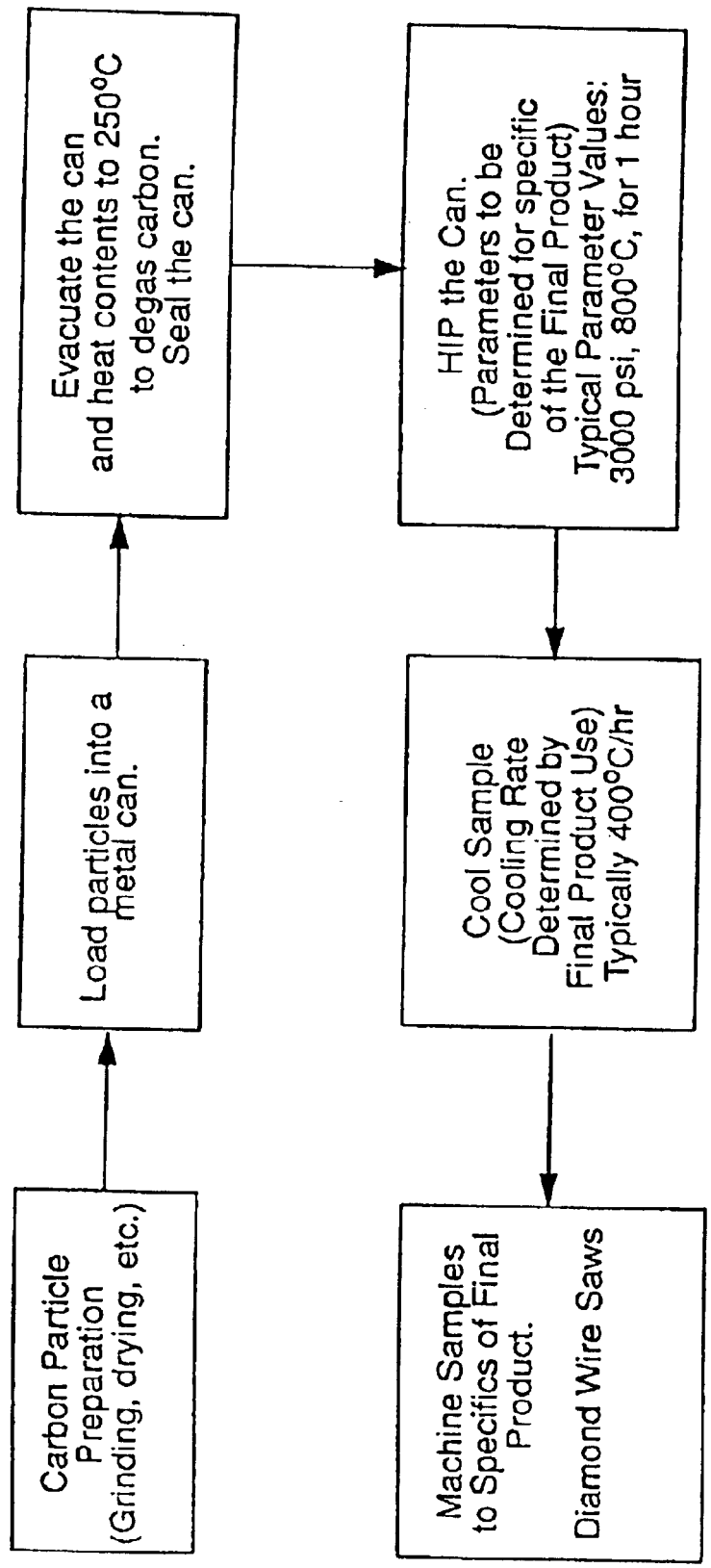
FIG. 1 is a flowchart of one embodiment of the process embodying the invention.

Before one embodiment of the invention is explained in detail, it is to be understood that the invention is not limited in its application to the details of construction and the arrangement of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE PREFERRED EMBODIMENT

The present invention involves the consolidation of amorphous carbon using heat and pressure for a prescribed time to produce a novel material, termed herein consolidated amorphous carbon (CAC) material, that is still amorphous and that has superior properties over currently available carbon materials. The properties of the CAC material can be altered by choosing different source materials, by controlling the process parameters of the manufacturing process, or by blending specific materials prior to processing. The properties of the CAC material that can be varied include, for example, densification, strength, porosity, conductivity and adsorptive surface area. By selecting materials and process parameters to achieve desired properties, CAC materials call be tailored for their use in a specific application such as electrochemical applications (i.e., water treatment, desalination, energy storage devices) or structural materials (i.e., carbon—carbon composites, low density/high strength members). The resulting CAC material is strong enough for handling and is able to be machined, ground or cut into the desired shape. Grinding or cutting tools such as a diamond cutting saw can be used to bring the CAC material to the final specifications for the specific application. The CAC material visually looks like non-shiny graphite.

With respect to source material, preferably, the form of amorphous carbon that is used in the present process is powder activated carbon. The examples set forth herein utilize this form of amorphous carbon, however, it should be noted that the invention is not limited to the activated carbon form of amorphous carbon. The principle characteristic of the CAC material that may be altered by using different amorphous carbon source material is the adsorptive surface area. Carbon particles that have high specific surface areas (as measured by the BET isotherm or other analytical techniques) can be selected to increase the net surface area of the CAC material after processing. Carbon source material can be selected based upon surface area, hardness, density and grain size.

For example, activated granular carbon with an active surface area of 1400 $m^2/g$ was used to manufacture bulk CAC material that had a net surface area of about 1200 $m^2/g$. CAC material was observed to have surface areas approximately 10% less than the original source material depending on the processing parameters. Activated carbon is currently commercially available with adsorptive surface areas as high as 3000 $m^2/g$ and it is believed that the process of the present invention could be used to generate CAC materials with 2800 $m^2/g$ of surface area.

Preferably, the device that carries out the elevated temperature compression of the amorphous carbon is a hot isostatic press (HIP) such as the MINI HIPer manufactured by ABB Autoclave Systems Inc. An advantage of using isostatic pressure is that the consolidation of the carbon is uniform throughout the material. However, it should be noted that other devices in addition to HIPs can be utilized for the consolidation under heat and pressure of the amorphous carbon.

With respect to the process parameters in the manufacture of the CAC materials, the process parameters of temperature, pressure and time can be varied to alter the specific characteristics and properties of the produced CAC material. Preferably, the temperature call range from 200° C. to 2700° C., the pressure can range from 500 to 50,000 psi and the holding time or time at temperature and pressure may vary from 0.5 to 20 hours. Preferably, the target pressure is obtained and the temperature is thereafter ramped up to the target value in a period of time such as one hour. It will be appreciated that all of these parameters interact and that one could use a condition outside these cited ranges by compensating changes in other parameters.

The specific combination of parameters that may be applied is determined for the specific material properties desired. For example, powder activated carbon consolidated at a temperature of 800° C. and a pressure of 3 ksi for one hour is more porous and more brittle than carbon consolidated at a temperature of 900° C. and a pressure of 25 ksi for one hour. The first CAC material is best used in an application such as an electrode, while the second CAC material could be used as a structural material. Generally, changes to the process parameters of temperature, pressure and time directly effect the properties of final density, strength, and porosity of the CAC material while the properties of conductivity, strength and adsorptive surface area are altered to lesser degree.

With respect to temperature in particular, the temperature range of 600° C. to 1400° C. is most preferred for most applications. Most preferred temperatures for forming electrodes from CAC material is in the lower end of the range, from about 600° C. to about 1000° C. Most preferred temperatures for forming structural products from CAC material is in the higher end of the temperature range, from about 800° C. to about 1400° C.

With respect to pressure in particular, most preferably, the pressure ranges from 500 psi to 25,000 psi. Pressures in the lower end of these ranges, for example 500 psi to 20,000 psi are typically preferred for making electrode material. Pressures in the higher end of the range, from 2000 psi to 25,000 psi are typically preferred for making structural products. Pressure has all influence on the capacitance of any electrode made from CAC material. With higher pressures, more dense materials are produced, macropore size shifts and therefore a CAC material with a lower capacitance is obtained.

With respect to holding time, holding times of from about 0.75 hours to about 10 hours are typical for the present process. Preferably, for electrode material, the holding times are shorter due to the desired surface area and porosity. It is generally beneficial to cool the CAC material products gradually after processing. Gradual cooling rates of from about 200° C./hr to about 1000° C./hr are typically, with ranges of 300° C./hr to 800° C./hr being most preferred.

Mixing fibers or other particles with the carbon source material prior to processing can dramatically increase the tensile and compressive strength of the CAC material. Long graphite fibers, for example, can be blended to improve the directional strength. Short whiskers could be added to improve the strength isotropically. Depending on the processing parameters, the carbon particles in the source material will interact with any added carbon fibers in much the same way that they interact with each other, reducing the amount of pull-out or crack propagation. The weight proportion of added material in the final CAC product can range from 0% to 40% and higher.

Figure 2:
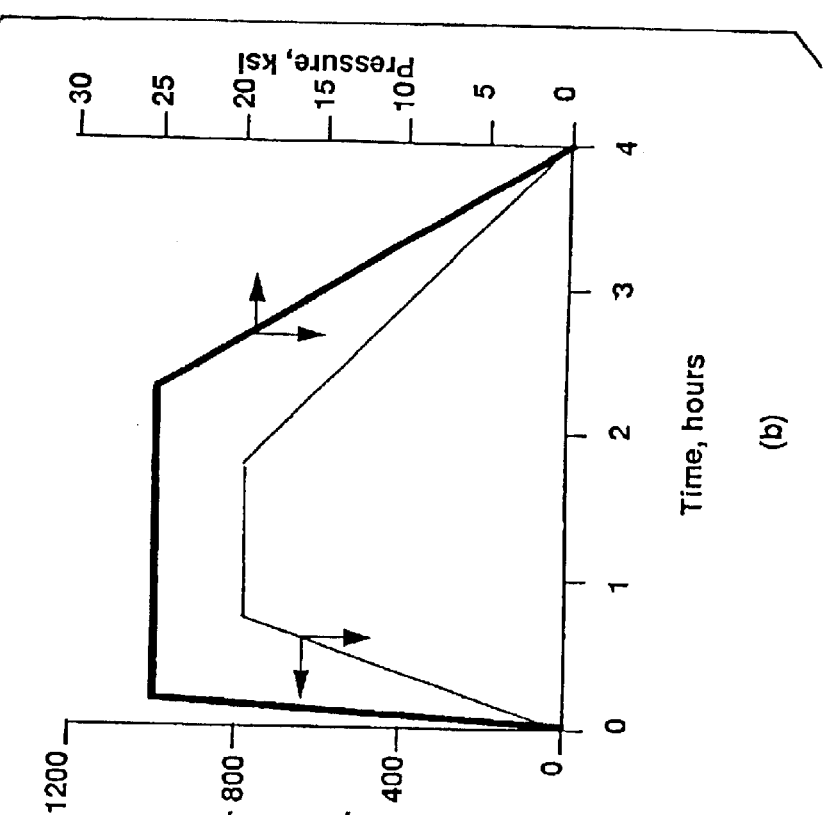
FIG. 2(a) is a graph depicting exemplary pressure and temperature profiles for the process for manufacturing an electrode material.
FIG. 2(b)) is a graph depicting exemplary pressure and temperature profiles for the process for manufacturing a structural material.
Figure 2:
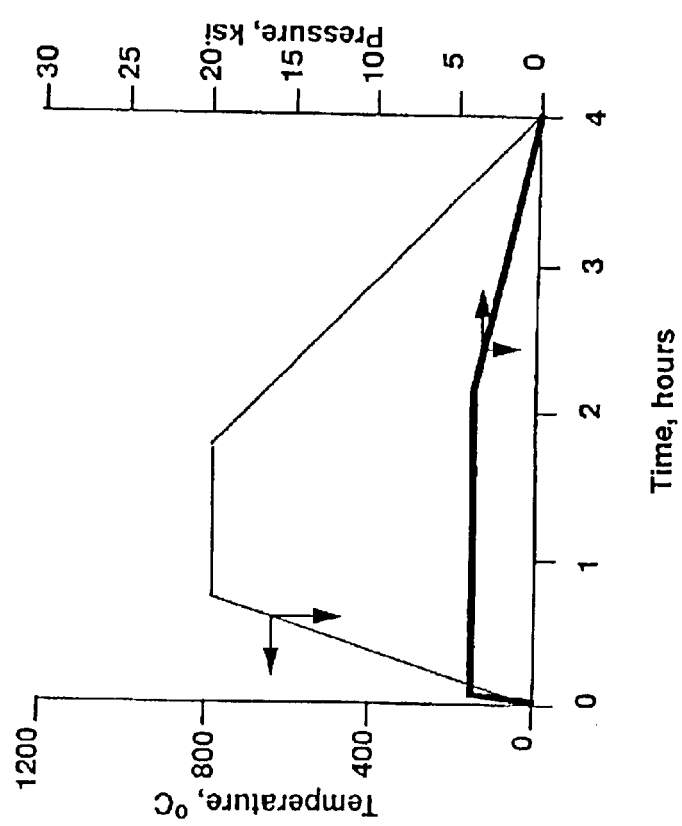

Referring now to FIG. 1, one specific embodiment of the present process is illustrated for the efficient and environmentally benign production of CAC materials. The illustrated process utilizes granular amorphous carbon that has been prepared such as by grinding or drying. The carbon particles are loaded into a capsule such as a metal can made from copper or stainless steel, and thereafter subjected to isostatic pressure and temperature for a period of time in a HIP. The process parameters are varied in a manner commensurate with the desired end use of the material produced. As shown in FIG. 1, typical process parameter values include 3 ksi at 800° C. for 1 hour. Further examples of pressure, temperature and time profiles are shown in FIG. 2(a) for exemplary CAC electrode material and FIG. 2(b) for exemplary structural CAC material.

The process of the present invention as shown in FIG. 1 yields a monolithic type material of consolidated activated carbon without binders. The mechanism of consolidation under elevated temperature and pressure is believed to be related to the limited diffusion taking place in the region where the activated carbon powders are in contact. From a powder sintering point of view, the curvature of the particle surface provides the driving force for consolidation as the system tends to reduce the surface energy by reducing the curvature of the particle surface. Carbon is a material with an extremely high melting (softening) point, about 3650° C. for graphite. Therefore, sintering of carbon is almost impossible under normal conditions without the addition of binders or fluxes. According to the present invention, sintering of activated carbon is made possible by the application of certain pressure.

Figure 3:
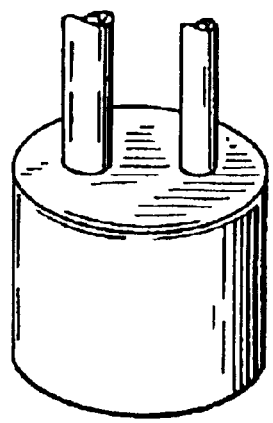
FIG. 3 is a front view of a capsule used in the process.
Figure 4:
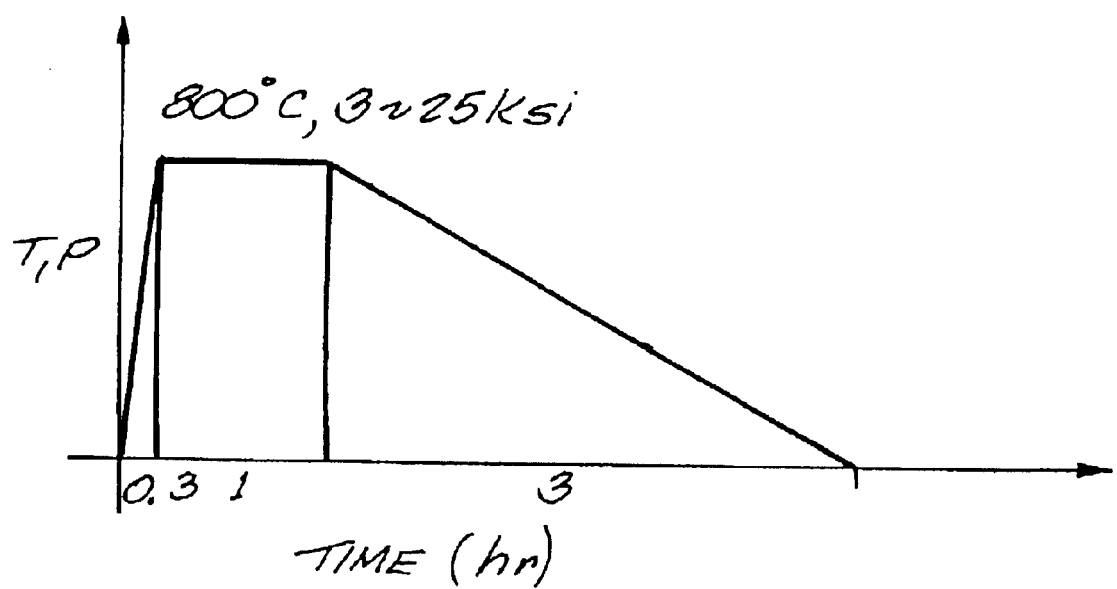
FIG. 4 is a graph of a temperature and pressure profile used in one embodiment of the process.

A more specific example of the novel process is set forth as follows. Activated carbon granules, CX0648-1 available from EM Science, size 0.5–0.85 mm, BET specific surface area 1400 m$^2$/g, were washed with distilled water and dried at 70° C. for 24 hours. A rod mill was used to grind the dried granules into fine powders. The grinding process lasted about 15 minutes at room temperature. A copper can with a design as illustrated in FIG. 3 was used as the capsule. The activated carbon powders were filled through the stems of the capsule which was sealed right after filling was finished. The filled capsule was then degassed under vacuum for 12 hours at a temperature of 150° C. Copper wool and porous alumina were used as a filter to avoid the carbon powder being drawn out. After degassing, the stem was sealed with argon weld and the package was ready for elevated temperature compression. The HIP technique was employed and carried out using an ABB Autoclave Systems Inc. MINI HIPer with argon as the medium. A temperature of 800° C. was used. In order to consolidate the carbon powders while maintaining the large surface area and high porosity, a low pressure range was used, which specifically ranged from 3 ksi (21 MPa) up to 25 ksi (172 MPa). The holding time was one hour to ensure good consolidation. The time scheme used is illustrated in FIG. 4. After cooling to room temperature, the capsule was cut open and the hockey puck like CAC material was removed.

The monolithic CAC material manufactured by this novel process can be characterized by any of several properties including adsorptive surface area, porosity, density, strength, conductivity, surface morphology, x-ray diffraction and electrochemical properties. Each of these properties will be discussed in detail below.

With respect to surface area, this property can be measured for example using a BET surface area analyzer, model ASAP 2000 from Micromeritics Instrument Corporation. A sample of the CAC material is prepared by crushing the material into particles with a nominal size of about 2 mm. Before the BET measurement, samples are degassed at 250° C. under a flow of helium gas to remove moisture, and then weighed. Low temperature nitrogen gas (77 K) is used for BET analysis. In this analysis, the nitrogen gas is adsorbed on the clean solid surface to form a single molecular layer. The total amount of gas adsorbed is then determined by measuring the pressure change before and after an equilibrium state. The solid surface area is then calculated.

The BET measured surface area for CAC material using powder activated carbon processed at different pressures at 800° C. for 1 hour in a HIP are set forth in Table 1 as follows.

TABLE 1

Results of BET Analysis For CAC Material Processed with Different Pressures

| HIP Pressure (ksi)/(MPa) at 800° C. | BET Specific Surface Area (m$^2$/g) | Total Pore Volume (cm$^3$/g) | Micropore Volume (d <20 Å) (cm$^3$/g) |
|---|---|---|---|
| 25/172 | 931 ± 15 | 0.4599 | 0.2067 |
| 10/69 | 1026 ± 20 | 0.5068 | 0.2064 |
| 3/21 | 1238 ± 21 | 0.7159 | 0.2149 |
| raw activated carbon | 1400 ± 22 | 0.6239 | 0.2077 |

From Table 1 it can be seen that the surface area of the carbon decreased by only approximately 10% with consolidation at 3 ksi. This can be explained by the fact that higher pressures promote densification of the source material and tend to close the pores of the carbon. In comparison, with other activated carbon materials using binders, the surface area is reduced greatly (>50%) because of the occlusion effect. From the pore volume data set forth in Table 1, one can see that the micropore volumes of pores less than 20 Å did not change with the pressure. However, the total pore volume decreased significantly with the increases in pressure.

Accordingly, by changing the process parameters and by the selection of the source material, CAC material with varying surface areas, for example, between 400 m$^2$/g and 3000 m$^2$/g, can be produced.

Turning now to porosity, macroporosity and mesoporosity can be analyzed using a conventional mercury penetration method and a PORESIZER 9320 available from Micromeritics Instrument Corporation. During the analysis, mercury is intruded under certain pressure into the pores of the specimen. When an equilibrium state is reached, the applied pressure balances with the surface tension of mercury inside the pores. By measuring the volume intruded into the specimen, the pore volumes of correspondent pore diameters can be determined. Mercury pressure can range from atmospheric pressure to 30,000 psi (210 MPa) corresponding to a minimum pore diameter of about 6 mm. The pore diameters with largest volume and total porosity of the CAC materials analyzed are set forth in Table 2.

TABLE 2

Results of Mercury Porosimetry Tests on CAC Materials

| HIP Pressure (ksi)/(MPa) at 800° C. | Pore Diameter of Max. Volume (nm) | Porosity (%) | Micropore Volume (d <20 Å) (cm$^3$/g) | Skeletal Density (g/cm$^3$) |
|---|---|---|---|---|
| 25/172 | 61 | 11.94 | 0.7517 | 1.1918 |
| 10/69 | 330 | 16.83 | 0.9387 | 1.1287 |
| 3/21 | 720 | 31.02 | 1.0495 | 1.0897 |
| raw activated carbon | 909 | 19.76 | 0.6606 | 0.8233 |

Figure 5:
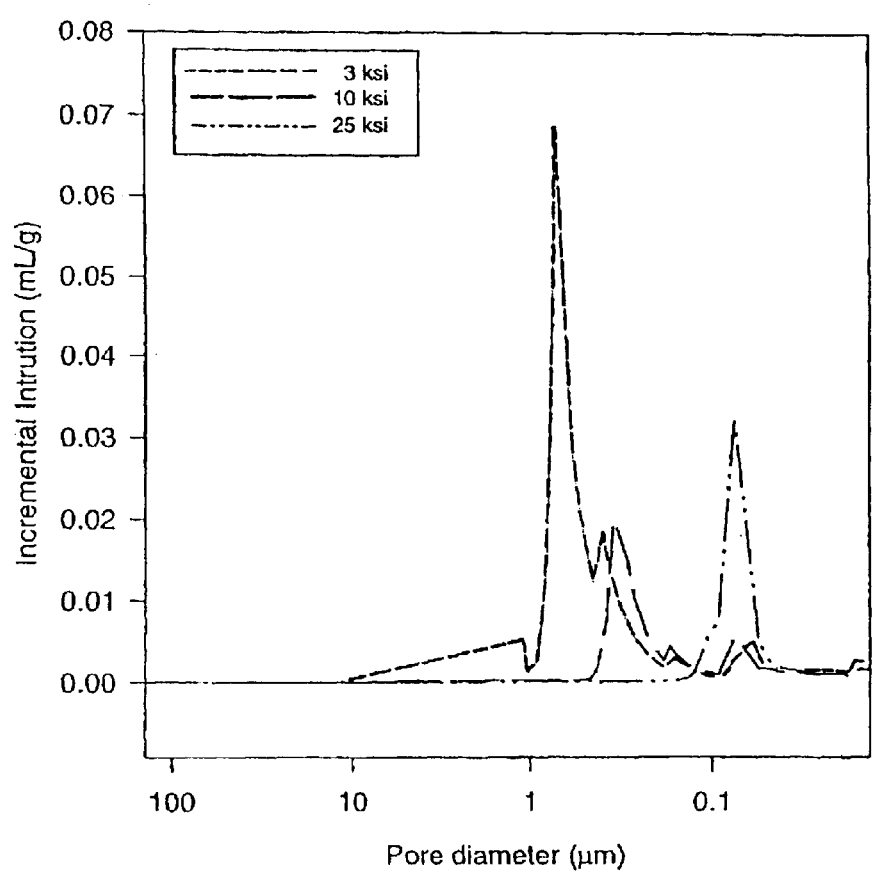
FIG. 5 is a graph of the relative pore sizes for the novel material manufactured under various pressures.

Pore size distribution of CAC material with differing process pressures at 800° C. is shown in FIG. 5. It can be seen from Table 2 and FIG. 5 that the pore size distribution of the CAC material is related to the process pressure. For example, the pore diameter of maximum pore volume is the largest when activated carbon powders were consolidated under a process pressure of 3 ksi. With the increase in pressure, the pore diameter of maximum pore volume shifts to smaller sizes and the total pore volume decreases. Since macropores as large as several hundred nanometers will greatly facilitate the process of mass transfer of electrochemically active species in the electrolyte, they are an important characteristic for activated carbon electrodes. From Table 2 it can also be seen that the skeletal density of consolidated activated carbon is less than 1.5 g/cm$^3$, which indicates that the microporosity is still large after consolidation using the present invention.

The degree of porosity (pore volume remaining between the particles after processing) of the CAC material can vary from about 55% (voids by volume) to less than 1% depending of the process parameters employed. Typically, the higher porosity CAC material (less consolidation) is ideal for electrochemical applications while more consolidated CAC material (less porosity) will have better structural properties. Porosity has an influence on the CAC material's capacity for ion storage such as in desalination units and also affects regeneration time when CAC electrodes are discharged. The voids between the carbon particles tend to shrink as the CAC process continues and they could be completely eliminated provided that a sufficiently high temperature and pressure are achieved. These voids, however, are found to be useful in the electrochemical applications since they would allow electrolytes to reach the inner part of the electrode. Thus, to retain some porosity, a lower pressure is preferred in this case while it is necessary to maintain high temperatures in order to facilitate the diffusion process (i.e. consolidation).

With respect to density, the process parameters can be controlled to increase densification so that the CAC material will have better mechanical properties and be cheaper to produce than current carbon—carbon composites or structural materials which are manufactured by a resin pyrolysis process. Because the CAC material is principally particles of carbon that have been sintered by the manufacturing process, the degree of densification will determine the density of the material. Consolidation of amorphous carbon particles at high temperatures and pressures causes the particles to bond together resulting in a monolithic material that has excellent thermal properties and high strength.

With respect to strength of the CAC material, the consolidation process of the present invention results in a material that has high strength and excellent thermal properties. Strength can be determined by standard tensile and compression tests and will vary with the degree of densification. CAC material that has little or no void spacing will have higher strength than CAC material with more void volume. The strength can be increased if fibers are admixed with the carbon prior to consolidation. Carbon fibers, for instance, will bond with the carbon powders. This bonding will give the CAC material greater strength by dramatically halting crack propagation.

With respect to the property of conductivity, conductivity is an important property of electrode material. To be effective, electrode material has to be highly conductive. Typically, activated carbon particles mixed with binder materials to form solid electrodes have a high resistivity of more than 15 Ω·cm. CAC materials can be produced having much lower conductivity values, on the order of 0.04 Ω·cm to 1.5 Ω·cm, for example. The electrical resistivity of the CAC material can be measured with a conventional four-point probe resistivity instrument. The resistivity of the specimen is calculated by dividing the supplied current from the voltage measured, with the results further corrected for the specimen shape factor. Exemplary results are as follows.

TABLE 3

Resistivity of CAC Material

| HIP Pressure at 800° C. for 1 hour (ksi/MPa) | Resistivity (Ω · cm) |
| --- | --- |
| 25/172 | 0.047 |
| 10/69 | 0.060 |
| 3/21 | 0.134 |

As shown in Table 3, the higher the process pressure, the lower the resistivity of the CAC electrode material. However, even at lower process pressures of 3 ksi, the resistivity of the CAC material is still low as compared with those activated carbon materials using binders. The reason for this is that the carbon particles in the CAC material are interconnected rather than merely in contact with each other.

With respect to surface morphology, this property of CAC material can be investigated using scanning electron microscopy (SEM). SEM pictures of the fractured surface of CAC materials processed at different parameters were obtained. From these SEM pictures, it can be seen that the carbon particles formed agglomerates during processing even though no binder was used. At lower temperatures or lower pressures, the carbon particles still kept their shape, with large voids between them. For higher temperatures and pressures, the carbon particles tended to mingle and form a continuous matrix structure. Neck formations between carbon particles are seen indicating that the particles are interconnected after processing rather than loosely bonded as in the case where binders are used. Such an interconnected particle structure provides the material with strength and conductivity.

With respect to x-ray diffraction, because the source material is amorphous carbon, and the parameters of the process are not stringent enough to recrystallized the carbon to form graphite, x-ray diffraction patterns of the CAC material show little or no crystallization. The process of the present invention is not intended to crystallize the carbon source material but rather makes the random pattern of graphine planes less random.

Figure 6:
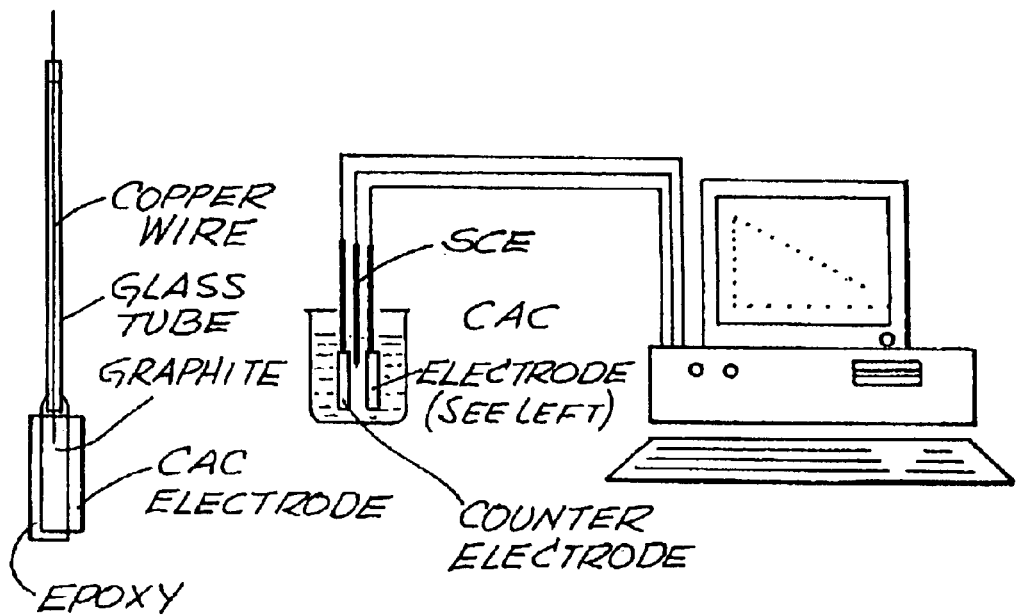
FIG. 6 is a schematic of the set up for the study of electrochemical properties of the novel material.

Turning now to electrochemical properties of the CAC material, these properties can be studied with a computerized potentiostat and the set up as shown in FIG. 6. For example, CAC material was cut into pieces of electrode material dimension as 15×15×1 mm. A graphite block was used as a current collector and supporting material. The CAC electrode material was adhered to the graphite with graphite powder filled epoxy. Other exposed surfaces of the graphite were encapsulated with epoxy to avoid contact with electrolytes. The assembled electrode was then mounted on one end of a 20 cm glass tube through which a copper wire was directed as the lead.

One electrochemical property investigated was cyclic voltammetry (CV). CV is an electrochemical method used for studies of redox couples of a system. In a CV study, the applied voltage over the working and counter electrode (or reference electrode) ramps up and down. During this process, if a redox couple exists in the system, a current peak will be depicted in the current profile in both scan directions. These peaks represent the generation and consumption of a reduction or oxidation species brought by the variation of the applied potential. If there is no significant redox reaction taking place in the system, the current vs. potential curve will be flat indicating that the electrode is stable within the scan range.

Figure 7:
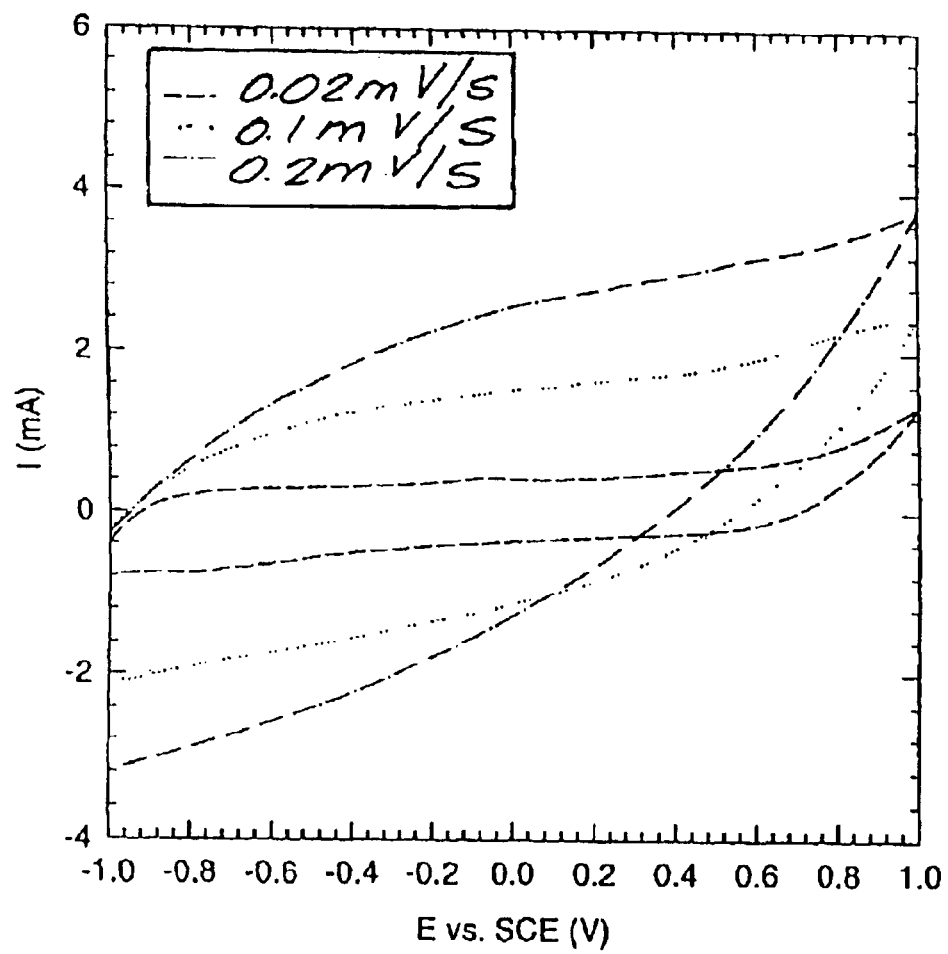
FIG. 7 is a graph of cyclic voltammetry (CV) curves of the novel material.

To investigate the behavior of the CAC material as an electrode in aqueous systems, CV experiments were carried out. A CAC material electrode was used in the set up of FIG. 6 with a platinum basket used as the counter electrode and a saturated calomel electrode used as the reference electrode. FIG. 7 is a graph showing the cyclic voltammogram of the CAC material (processed at 3 ksi pressure at 800° C. for 1 hour) in a 1 M KCl solution with different scan rates. It can be seen from FIG. 7 that the CV curves show a featureless polarization in both scan directions, while a capacitive nature of the electrode is clearly seen by noticing that the current increases with the scanning rate. The potential window is wide enough (−1.0 to 1.0 vs. SCE) to allow the CAC material electrode to be used for general applications in aqueous solutions without significant oxidation/reduction reactions between the electrode material and the solvent.

Figure 8:
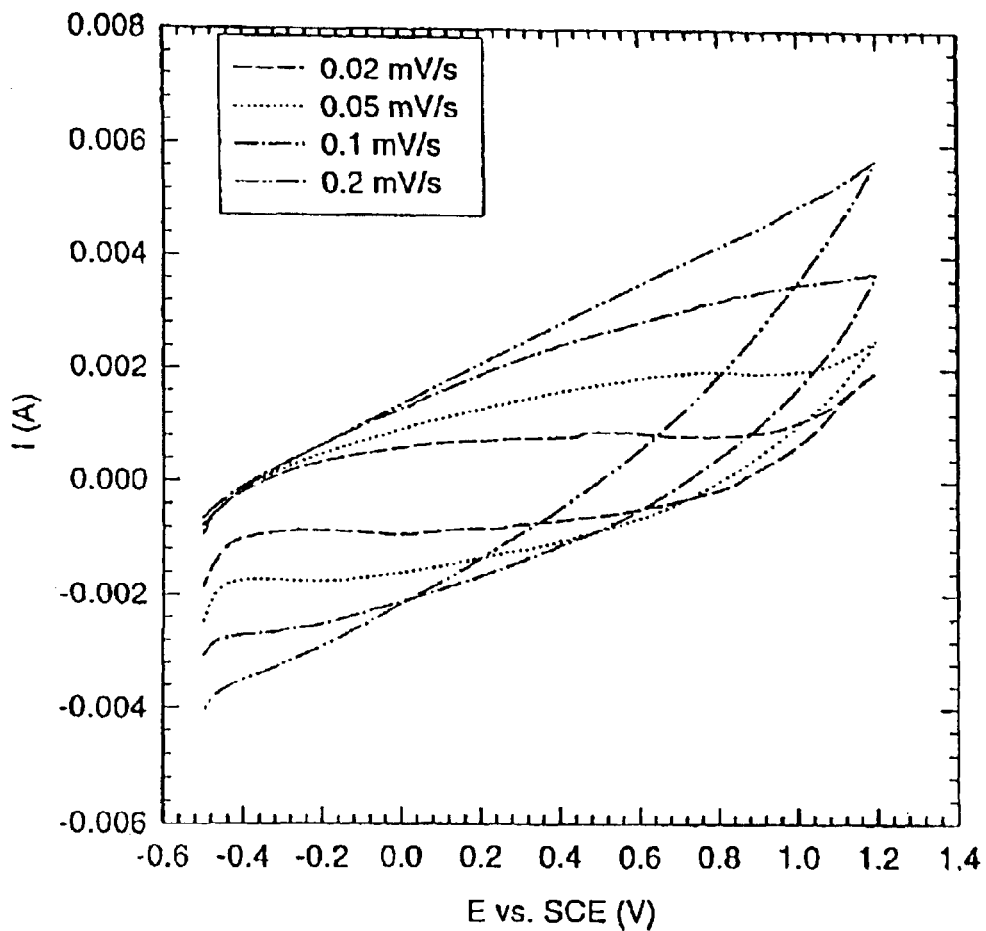
FIG. 8 is a graph of CV curves of the novel material.
Figure 9:
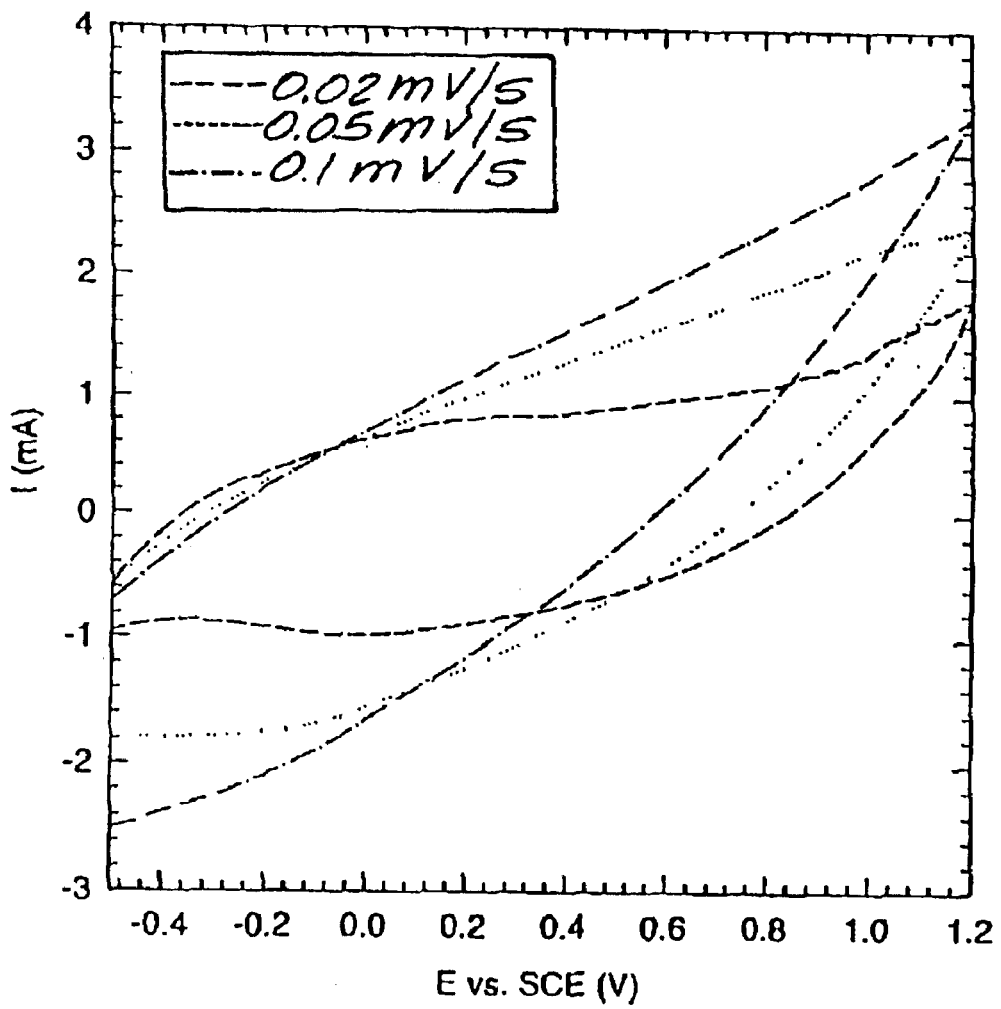
FIG. 9 is a graph of CV curves of the novel material.
Figure 10:
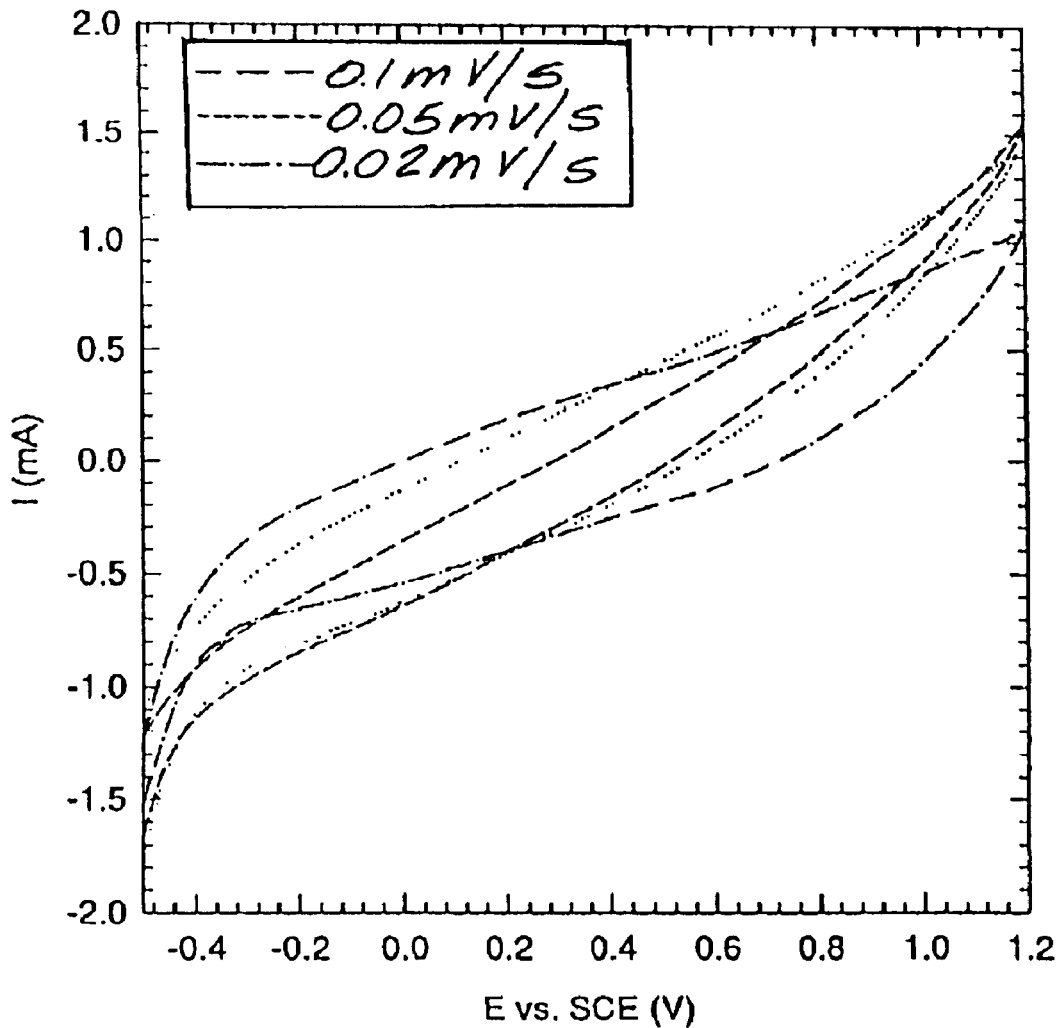
FIG. 10 is a graph of CV curves of the novel material.

FIG. 8 shows the CV curves of a CAC material electrode which was processed at 3 ksi pressure at 800° C. for 1 hour. The electrolyte used was a 30% wt sulfuric acid solution, which is widely used for ultracapacitors. The featureless curves indicate that the CAC material is suitable to be used as electrodes in ultracapacitors. The specific capacitance of the electrode is estimated at about 210 F/g. FIGS. 9 and 10 illustrate the CV curves for CAC material electrodes processed under higher pressures. One can see that with higher pressures, the double layer charging current decreases.

The CAC material of the present invention has superior properties over current carbon based materials. Carbon electrode materials require good electrical conductivity, and, for most applications, require large surface areas. As previously described, actuated carbons are very conductive, consolidation of the particles will ensure that all particles are connected making the monolithic solid conductive. By selecting high surface area carbon for the processing accordingly to the invention, for example, 2000–3000 $m^2$/g, the CAC electrode material generated by the process will have considerably larger available surface areas than current materials. The CAC material described herein has a substantially higher net capacity for ions or charge than currently available materials. The CAC material of the present invention has excellent electrical conductivity and very high specific surface area (>1200 $m^2$/g) depending on the source material used.

Some of the specific applications potentially available for this CAC material include, but are not limited to, the following two areas, activated carbon electrode material and structural carbon materials. Other applications not specifically stated for the novel CAC material are assumed to be part of the invention.

The novel CAC material has exceptional properties for use as electrode material. The process parameters for producing CAC electrode material should be maintained to only partially densify the carbon materials, thus keeping larger pores between the particles, but still maintaining good particle—particle contact. The macroporosity, controlled by the degree of consolidation attained while processing, enables the CAC material to be better for electric double layer storage materials. The following list describes some of the potential applications for the novel CAC material as an activated carbon electrode, however, this list is not intended to limit the potential application of the CAC material: desalination of brackish or sea water; deionization of water; water treatment including softening or pH control; solid-liquid separation including removal of line, solid particles from water streams or slurries; metal concentration or direct recovery by electroplating; environmental processing including direct electrochemical destruction of pollutants and contaminants from water; ultracapacitor; energy storage devices for electric cars, electronic devices, etc.; batteries and fuel cells.

The novel CAC material has exceptional properties for use as structural materials. Carbon structural materials require little or no macroporosity to be effective. Accordingly, the process parameters for CAC material intended for structural use should be chosen to more fully densify the carbon materials, thus reducing the net amount of large porosity. Fibers such as those of graphite, silicon carbide, etc. could be blended with the carbon source material in varying amounts to provide structural reinforcement in the CAC material. The following list describes some of the potential applications for the CAC material as a structural material, however, this list is not intended to limit the potential application of the CAC material: applications in corrosive or chemically active environments; applications requiring high-temperature strength; applications of materials with high strength/weight ratio and applications of materials with low density.

The following are examples of the use of the novel CAC material in varying applications. The examples are intended to be illustrative of potential uses of the CAC material and are not intended to limit the application of the CAC material.

EXAMPLE 1

Ultracapacitor

If an electrolyte solution is placed between two electrodes made of the CAC material, an applied voltage will separate the various ions of the electrolyte into the respective double layers that form. The result is a device that can store electrical energy, which can be quickly recovered. When a battery is discharged quickly, its voltage will drop substantially. Net result of periodic discharges is a shorter battery life. But, if a storage device is available that could take the burden of fast discharges, then it could be used in combination with a battery, and thus extend the battery 's life through a process known as load leveling. Such applications could be incorporated into modern electric cars, electric toys, etc.

Figure 11:
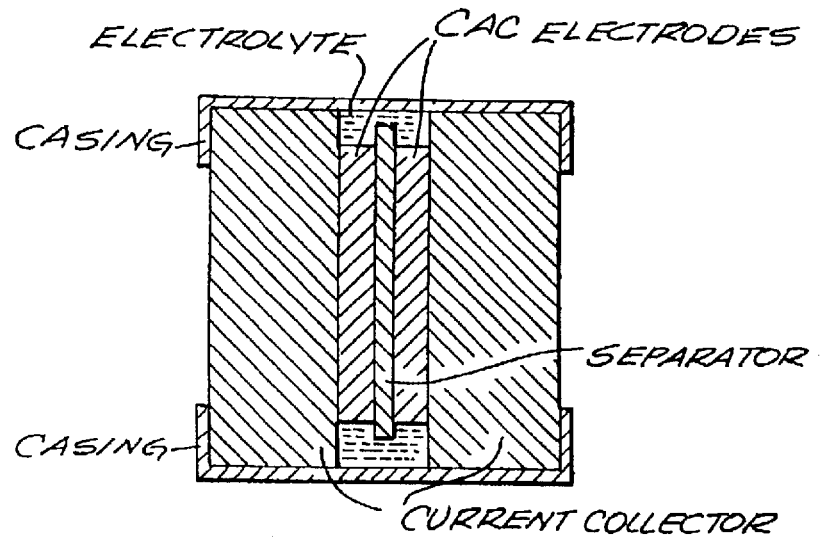
FIG. 11 is a schematic depicting the use of the novel material in an ultracapacitor.

With reference to FIG. 11, an ultracapacitor was constructed using CAC material as electrodes. Two pieces of the electrodes were sandwiched between two graphite current collectors which have been impregnated with wax to make them leak-proof and were polished before use. The electrodes were dried in a vacuum oven for at least 12 hours and subsequently back-filled with desired electrolytes to ensure good impregnation. The electrodes were further ultrasonically treated for 15 minutes to remove loose particles on the outer surfaces. A glass fiber or non-woven cloth was placed between the electrodes to function as an insulating separator. A thermal shrinkable tube was used as a casing material. Assembled ultracapacitors were tested under different charging and discharging conditions. Differential capacitance was measured by a constant current discharge method. The maximum discharge current was estimated with a potential step method.

Two electrolyte systems were used for the ultracapacitors, an inorganic aqueous system and an organic non-aqueous system. For the inorganic system, 30% wt of sulfuric acid (reagent grade) in deionized water was used as the electrolyte. The results are set forth in Table 4 below.

TABLE 4

Specific Capacitance of Ultracapacitors made from CAC material Electrodes at 1.0 V Potential

| HIP Pressure (ksi/MPa) | Cell Specific Capacitance (F/g) | Mass Specific Capacitance of the Electrode (F/g) | Volume Specific Capacitance of the Electrode (F/cm3) |
|---|---|---|---|
| 3 | 53 | 212 | 160 |
| 10 | 45 | 160 | 152 |
| 21 | 20 | 80 | 84 |

The capacitance per unit area is calculated by dividing the mass specific capacitance by the value of the surface area (see Table 1) with the results as follows in Table 5.

TABLE 5

Double Layer Capacitance Per Unit Area

| HIP Pressure (ksi/MPa) | Capacitance Per Unit Area ($\mu$F/cm2) |
|---|---|
| 3/21 | 17.0 |
| 10/69 | 15.6 |
| 25/172 | 8.6 |

In order to inspect the ultracapacitor's ability to quickly discharge its stored energy, a CAC material (processed at the 800° C. and 3 ksi for 1 hour) capacitor was subjected to discharge at various current densities. The capacitance measured for each discharging condition is listed in Table 6.

TABLE 6

Capacitance at Different Discharging Conditions

| Discharging Current Density (mA/cm2) | Measured Cell Specific Capacitance (F/g) |
|---|---|
| 3 | 51 |
| 30 | 53 |
| 100 | 48 |

Table 6 demonstrates that the novel CAC material electrodes are capable of undergoing rapid charging and discharging.

The energy density of the ultracapacitors was calculated to be higher than 7 Wh/kg based on electrode materials only, and 3.5 Wh/kg if one takes into account the weight of the electrolyte, separator and current collector.

The peak power density of the capacitors was estimated using a transient method. For material with a density of 0.75 g/cm$^3$, a 2 cm 2×0.1 cm electrode weighs 0.15 g and a total of 0.3 g of electrode material was used for the cell. A power density based on the CAC electrode material is estimated to be 23 kW/kg. This performance is made possible by the unique pore size distribution and the high conductivity of the CAC material.

Turning now to the organic system, since the break down voltage of an organic electrolyte is much higher than an aqueous electrolyte, a higher operating cell voltage can be achieved by using an organic electrolyte. For the organic system, propylene carbonate (PC, Alfa AESAR, 99%) was used as the solvent with tetraammoniumethylene tetrafluoroborate ($Et_4BF_4$) as the salt, at a concentration of 1 M. Since PC is very sensitive to moisture, all tests with the organic system were carried out in a glove box under a dry nitrogen atmosphere. The measured capacitance of the CAC material (processed at 800° C. and 3 ksi for 1 hour) at 3 V potential was 22.5 F/g, corresponding to an energy density of 28 Wh/kg of electrode material. If the cell voltage is 2.8 V, an energy density of 24.6 Wh/kg is estimated.

EXAMPLE 2

Desalination Unit

A capacitor of CAC material could be used to remove the salt from water, in much the same manor as an energy storage device stores energy. As the charged units "load up" on the salts from the water, the units will charge. Once filled, the unit energy could be used to drive a second unit. As the first discharges, the salt ions fixed on the surface will be discharged, thus regenerating the electrode for reuse. The net energy savings of desalination could be large, as compared to current techniques, such as reverse osmosis, distillation, etc., which are processes that require high pressures and/or high temperatures. In addition, given the larger capacity of the CAC material, the size of the units would be greatly reduced compared to conventional desalination units with currently available carbon.

Figure 12:
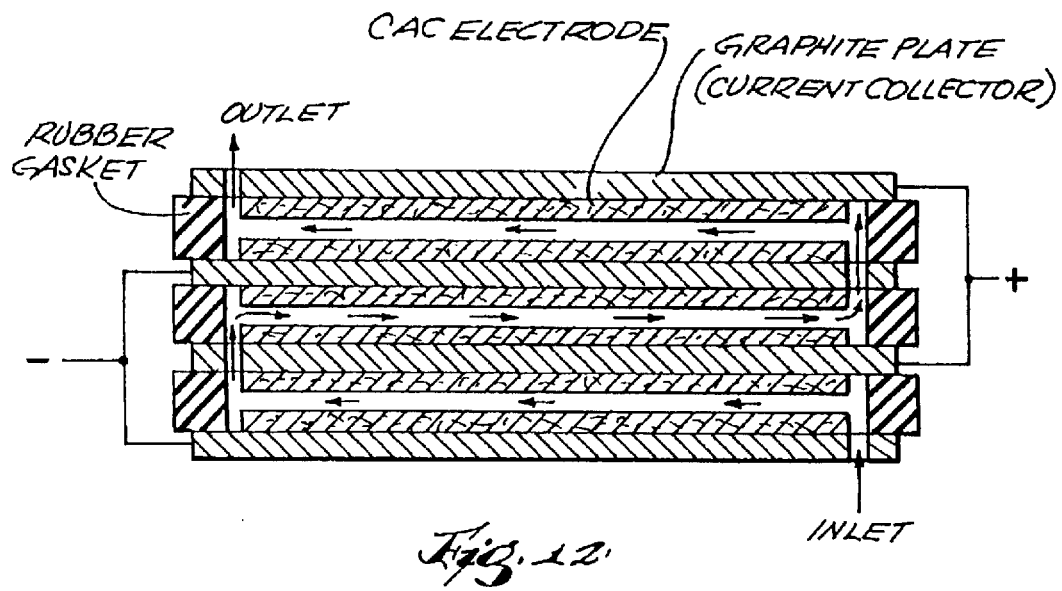
FIG. 12 is a schematic depicting a desalination/deionization cell utilizing the novel material as an activated carbon electrode.

With reference to FIG. 12, a desalination cell was built with CAC material as a carbon electrode. The carbon electrodes of 55×15×0.8 mm were attached to graphite foil current collectors with a thin layer of graphite powder filled epoxy in a bipolar configuration. A rubber gasket between the current feeders creates a channel between the two facing carbon electrode plates. A peristaltic pump was used to keep a constant flow of the solution. The concentration change of the salt at the outlet was monitored by a specific conductance meter. The applied voltages ranged from 0.8 to 1.2 V. Solutions with a conductivity ranging from 100 to 1000 $\mu$S were tested. All experiments were carried out at room temperature.

The results demonstrated the significant desalting effects were apparent with CAC material as the electrodes, considering the fact that activated carbon has no affinity to NaCl if there was no electric potential applied. The desalting effectiveness was more significant with the increase of the applied potential, about 80% removal of salt was achieved at 1.2 V. It was observed that the regeneration process was faster than the desalting process.

Figure 13:
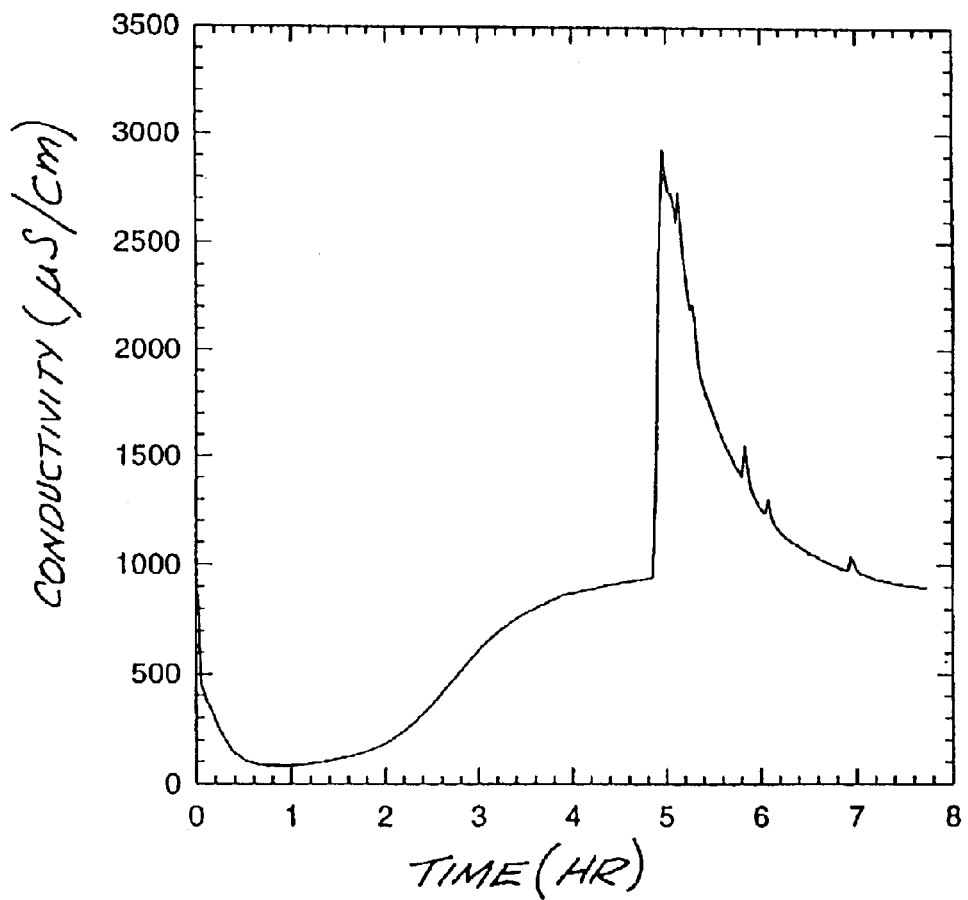
FIG. 13 is a graph showing the performance of a desalination device utilizing the novel material as an electrode to remove salt from water, with the initial part of the plot showing how the capacity of the device is loaded, the peak of the plot showing how the device is regenerated by shorting the charge causing the salt to return into the bulk solution.

Upon application of 1.2 V potential across the CAC material electrodes, a significant decrease in dissolved salt concentration can be achieved, as illustrated in FIG. 13. When the electrodes were shorted or grounded, the "absorbed" ions were released back into solution, and a peak salt concentration can be observed at the outlet. By doing so, a desalination and regeneration cycle is completed and the cell is ready for the next cycle. Since there is no large resistance to the flow of treatment solution, the pressure head is very low compared with a reverse osmosis process. Significant energy reduction using the CAC material electrodes is achieved over the distillation and RO processes of water desalination. Experiments showed that a very low current is required for desalting. In comparison with aerogel carbon electrodes, the CAC material electrodes have the advantage of rapid discharging rate because of the large macropores, and a relatively low cost to produce.

The desalting cells can be used for removing various ionic species in addition to NaCl. As long as a sufficient potential is applied across the CAC material electrode, ions will be removed from the solution and stored in the double layer.

After the electrodes are shorted, the ions are put back into the solution. An example with respect to softening water is set forth immediately below.

EXAMPLE 3

Deionization/Water Softening

A stream of Houghton, MI drinking water was pumped through a desalination cell constructed using CAC material as illustrated in FIG. 12 under a 1.2 V potential. All concentrations were determined using an inductively coupled plasma spectrophotometer. Significant removal of $Ca^{+2}$, $Mg^{-2}$, and $Na^+$ ions was observed, as set forth in Table 7. The table shows the specific ion concentrations in the feed water, the product water, and in the water that was in the cell when the voltage was shorted for regeneration.

TABLE 7

Deionization of Houghton, MI Tap Water (ICP Results)

| Metal Ions | Houghton MI Tap Water Concentration (ppm) | Deionized Water Concentration (ppm) | Regeneration Waste Concentration (ppm) |
|---|---|---|---|
| $Ca^{+2}$ | 60.00 | none detected | 160.0 |
| $Mg^{+2}$ | 11.88 | none detected | 31.11 |
| $Na^+$ | 16.16 | none detected | 44.82 |

Because of the fact that anions and cations are adsorbed on anodes and cathodes separately, scaling problems are reduced to a minimum. Deionization using CAC material electrodes is applicable to both industrial and household uses. For example, it can be used as a water softening treatment system for drinking water or for feed water to boilers. Electroplating and mining industries produce large amounts of waste discharges which could be treated with application of the present invention.

EXAMPLE 4

Copper Plating

CAC material was attached to a Pb current feeder and used as an anode in an electroplating circuit. Copper was plated on the cathode from solutions containing 400 mg $Cu^{+2}$/L at a voltage of 1.2 V. The large surface area of the anode improved the plating efficiency for even low concentration solutions. The charging current at the anode eliminates the necessity for a large overpotential as in conventional plating arrangements. The significance of this is that the CAC electrode material could be used effectively to directly recover copper from very low concentration solutions with very high current efficiency. Current technology for recovering copper from low concentration solutions uses solvents to concentrate copper to 30–40 g/L (300–400 times more concentrated than was used in this test of the CAC electrode material) to ensure high plating efficiencies. However, comparable plating efficiencies were noted with CAC material and a lower potential was required for plating as well.

EXAMPLE 5

Metal Concentration

Metal ions in aqueous solutions can be concentrated in much the same manner as demonstrated in Example 3. Low-grade gold ores are economically processed by dissolving the gold into cyanide solutions. The gold concentration in the solution is usually too low concentrations (as low as 1 mg Au/L) without further treatment. Typically, granular activated carbon is used to adsorb the dissolved gold from leach solutions. Once loaded with Au, the ions are stripped into solutions at concentrations of 10 to 1000 times higher than the feed concentrations. The stripped solutions can then be processed to recover the metallic gold.

Cathode and anode electrodes made of the CAC material were placed in a solution of gold cyanide. When no voltage was applied, both electrodes adsorbed 3 mg of Au/g of carboon. When a 1.2 V potential was applied, the anode adsorbed over 5.4 mg of Au/g. In a concentrating apparatus similar to the desalination unit, dilute Au solutions can be treated to remove the gold, and regeneration (by shorting of the potential) will result in higher gold concentrations. The advantage to this technique would be in the complete regenerative properties of the CAC material.

EXAMPLE 6

Destruction and Removal of Cyanide

Sodium and potassium cyanide are important reagents in the metal plating industry, precious metal mining, and in dye manufacturing, and are extremely poisonous. Very small amounts of free CN are allowed in waste streams from these industries. The CAC material electrodes are effective at removing the CN in water by electrochemical oxidation.

Solutions containing low amounts of NaCN were pumped through the desalination units described in Example 3. It was observed that the potential on the units was sufficient to oxidize the free cyanide directly to cyanate (OCN). While cyanide is a regulated toxin, cyanate is not toxic or controlled, and is free to be discharged to waste locations. This result indicates the power of the process to destroy environmentally troublesome matter in water.

EXAMPLE 7

Particle Slurry Separation

Particles generate a small electrochemical charge when placed in water. The magnitude and sign of the charge is determined by the solid composition and the electrolyte concentration in the water. Removal of fine particles (such as clays, phosphates, potash) from water is difficult because the like charges on the particles tend to repel each other. This action tends to stabilize the fine particles in the water; that is, the fine particles will not flocculated, and settle.

When the CAC material electrode was placed in a slurry, and a 1.2 V potential was applied between it and a graphite electrode (anode), the result showed that fine, negatively charged particles migrated and attached to the anode, much like anions in an electrolyte solution. The anode could be taken out of the slurry, the solids removed, and be ready for reloading. Placing the cathode electrode in a solution of ferric and ferrous iron readily discharged it. The electrode discharge reaction resulted in the reduction of $Fe^{+3}$ to $Fe^{+2}$. After discharging, it was ready to remove more solids.

We claim:

1. A processed carbon material comprising granular amorphous carbon that has been consolidated in a hot isostatic press under elevated temperature and pressure to produce an amorphous carbon material, wherein the temperature is in the range of about 200–1000° C.

2. The processed carbon material of claim 1 wherein the amorphous carbon is ground before consolidation.

3. The processed carbon material of claim 1 wherein the amorphous carbon is activated carbon.

4. The processed carbon material of claim 1 wherein the amorphous carbon is powder activated carbon.

5. The processed carbon material of claim 1 wherein the consolidation is uniform throughout the carbon material.

6. The processed carbon material of claim 1 wherein the temperature is at least about 600° C.

7. The processed carbon material of claim 1 wherein the pressure is isostatic.

8. The processed carbon material of claim 1 wherein the pressure is in the range of about 500–50,000 psi.

9. The processed carbon material of claim 1 wherein the pressure is in the range of about 500–20,000 psi.

10. The processed carbon material of claim 1 wherein the desired pressure value is obtained and thereafter the temperature is ramped up to the desired value.

11. The processed carbon material of claim 1 wherein the carbon is maintained at the desired temperature and pressure for a set period of time in the range of about 0.5–10 hours.

12. The processed carbon material of claim 1 wherein the carbon is cooled from the elevated temperature at the rate of between about 300–800° C./hour.

13. The processed carbon material of claim 1 wherein the amorphous carbon is mixed with graphite fibers before consolidation.

14. The processed carbon material of claim 1 wherein the carbon material has a surface area of at least 800 $m^2/g$.

15. The processed carbon material of claim 1 wherein the carbon material has a surface area of at least 1400 $m^2/g$.

16. The processed carbon material of claim 1 wherein the carbon material loses less than about one third of its surface area relative to the surface area of the amorphous carbon.

17. The processed carbon material of claim 1 wherein the carbon material loses less than about 15% of its surface area relative to the surface area of the amorphous carbon.

18. The processed carbon material of claim 1 wherein the degree of porosity of the carbon material is greater than 20%.

19. The processed carbon material of claim 1 wherein the carbon material has resistivity values in the range of about 0.04 $\Omega$·cm to 1.5 $\Omega$·cm.

20. The processed carbon material of claim 1 wherein the carbon particles in the amorphous carbon material are interconnected.

21. The processed carbon material of claim 1 wherein the temperature and pressure are optimized to produce carbon electrode material.

22. The processed carbon material of claim 21 wherein the amorphous carbon is powder activated carbon, the temperature is at least about 600° C., and the pressure is in the range of about 500–20,000 psi.

23. The processed carbon material of claim 1 wherein the temperature and pressure are optimized to produce structural carbon material.

24. The processed carbon material of claim 23 wherein the temperature is at least about 800° C. and the pressure is in the range of about 2000–25,000 psi.

25. A process for the production of a carbon material comprising the steps:
providing amorphous carbon; and
consolidating the amorphous carbon using elevated temperature compression without the use of a binder to produce an amorphous carbon material.

26. The process of claim 25 and further including the step of grinding the amorphous carbon before consolidation.

27. The process of claim 25 wherein the amorphous carbon is activated carbon.

28. The process of claim 25 wherein the consolidating is performed in a hot isostatic press.

29. The process of claim 25 wherein the consolidating is uniform throughout the carbon material.

30. The process of claim 25 wherein the consolidating is performed at a temperature in the range of about 200–2700° C.

31. The process of claim 25 wherein the consolidating is performed at a temperature in the range of about 600–1400° C.

32. The process of claim 25 wherein the consolidating is performed using isostatic pressure.

33. The process of claim 25 wherein the consolidating is performed using pressure in the range of about 500 psi to 50,000 psi.

34. The process of claim 25 wherein the consolidating is performed such that the desired pressure value is obtained and thereafter the temperature is ramped up to the desired value.

35. The process of claim 25 wherein the consolidating is performed for a set period of time in the range of about 0.5 hours to 5 hours.

36. The process of claim 25 and further including the step of mixing the amorphous carbon with graphite fibers.

37. The process of claim 25 wherein the consolidating is performed at an optimized temperature and pressure to produce carbon electrode material.

38. The process of claim 37 wherein the amorphous carbon is powder activated carbon, the temperature is in the range of about 600–1000° C., and the pressure in the range of about 500–20,000 psi.

39. The process of claim 25 wherein the consolidating is performed at an optimized temperature and pressure to produce structural carbon material.

40. The process of claim 39 wherein the temperature is in the range of about 800–1400° C. and the pressure in the range of about 2000–25,000 psi.

41. The process of claim 25 further including the step of cutting the carbon material.

42. A processed carbon material comprising amorphous carbon that has been consolidated under elevated temperature and pressure without the use of a binder to produce an amorphous carbon material.

43. A processed carbon material comprising amorphous carbon particles that have been consolidated under elevated temperature and pressure, wherein the amorphous carbon particles are coalesced without the use of a binder to form an amorphous carbon material.

44. A process for the production of a carbon material comprising the steps:
providing amorphous carbon; and
consolidating the amorphous carbon using no binder and using elevated temperature compression at a temperature in the range of about 200–2700° C. and at a pressure in the range of about 500–50,000 psi to produce an amorphous carbon material.

45. A process for the production of a carbon material comprising:
placing amorphous carbon without a binder in a hot isostatic press; and
operating the press at a temperature in the range of about 200–2700° C. and at a pressure in the range of about 500–50,000 psi to produce an amorphous carbon material.

46. A process for the production of a carbon material comprising:
placing amorphous carbon in a hot isostatic press; and
operating the press to consolidate the amorphous carbon using elevated temperature compression without the use of a binding agent to form an amorphous carbon material.

\* \* \* \* \*